3,118,811
MUSHROOM ONCOSTATIC PRINCIPLE
Eugene H. Lucas, deceased, late of East Lansing, by Margaret A. Lucas, executrix, and Richard U. Byerrum, both of East Lansing, Mich.
No Drawing. Filed Feb. 1, 1960, Ser. No. 5,615
5 Claims. (Cl. 167—65)

This invention relates to an oncostatic principle or principles obtained from mushrooms, and to the preparation thereof.

During the past several years several thousand materials have been tested for oncostatic activity. Of the materials tested, many have been synthetic reactive chemicals such as nitrogen mustards, ethylenimines, epoxides, steroid hormones, carbamates and esters of sulfonic acids. Many synthetic chemical anti-metabolites, such as the folic acid analogs, purines, pyrimidines, formamides, pyridoxine analogs, riboflavin analogs, amino acid analogs and various vitamin antagonists have also been tested. Besides the synthetic chemicals a great number of materials derived from animal sources have been tested for their anti-tumor activity. Examples of such materials are the spleen preparations, including antireticular cytoxic serum (ACS), various enzymes of animal origin, e.g. arginase, desoxyribonuclease and ribonuclease, and the urine preparations. Several materials derived from plant life and microorganisms have been tested also. Such material includes colchicine and podophyllin which are derived from higher plants, and many of the bacterial polysaccharides and antibiotics produced by microorganisms. Many other materials too numerous to mention may be found in the literature pertaining to the chemotherapy of neoplasms. Of these materials some have been found to have specific application while many others are considered of lesser value because of their negligible desirable effect or their excessive undesirable side effects.

The importance and urgency of discovering a material having the property of inhibiting neoplasms is obvious from the very extensive research which has produced the materials listed above. It is therefore an object of the present invention to provide a material which has significant oncostatic activity with a minimum of undesirable side effects.

Several test methods have been used to evaluate the activity of the chemotherapeutic substances mentioned above. Several testing procedures, as applied to many of the above mentioned substances are discussed in an article by C. Chester Stock in Advances in Cancer Research, volume 2 (1954), pp. 425 to 492. Among these tests those using solid tumors in vivo have been used most extensively. The substances subjected to such tests are evaluated as to their inhibition of the growth of neoplasms, ability to cause the failure of implants to grow, the rate of regression of measured neoplasms, effect on survival time of the host animal, or various cytological criteria.

Tests utilizing mouse sarcoma 180 are extremely useful in evaluating anti-tumor activity. Sarcoma 180 has rapid growth, almost 100% transplantability and a low regression rate. The methods and significance of the sarcoma 180 test, and of related tests, are described in considerable detail in Report No. 3–55, August 1955, entitled Studies in Experimental Cancer Chemotherapy, by C. Chester Stock, in Current Research in Cancer Chemotherapy. The test is also described in an article by Stock, C. C., and Rhoads, C. P., Evaluation of Chemotherapeutic Agents, pp. 18–190 (1949), Columbia University Press, New York, N.Y. In this test mice weighing approximately 20 grams are weighed at the beginning and end of the test. A tumor is induced by the injection of tumor fragments or cubes of approximately 1 to 2 mm. diameter subcutaneously into the axillary region. The substance being tested is injected intraperitoneally twice daily for seven days commencing 24 hours after the transplant of the tumor. After the injections, on the eighth day, the tumors are measured again and compared to their original size. A material which fails to hold the tumor growth to less than three quarters of the average diameter of the controls is considered to give a negative test result (−). Maximum rating (+) signifies that the growth of the tumor in the test has been restricted to less than one quarter of the growth of the controls. Other intermediate ratings are indicated below where test results are reported.

There is contemplated by this invention a novel treatment to inhibit neoplastic growth involving the administration of at least one oncostatic principle of a least one organism of the genus Calvatia. While, as will be shown, the subject matter of this invention has succeeded in inhibiting neoplastic growth in living animals, it has not yet received full clinical approval for use in humans.

There is further contemplated by this invention at least one oncostatic principle obtained from at least one organism of the genus Calvatia, characterized by being substantially soluble in water, substantially non-dialyzable, substantially insoluble in absolute benzene, ether, ethanol, methanol and acetonitrile, substantially insoluble in a 75% aqueous acetone solution, substantially stable in absolute ethanol, methanol, acetone, acetonitrile, ether and benzene, substantially stable during storage at −40° F. for six weeks, substantially stable to lyophilization, substantially filterable through a filter having the porosity of a Seitz filter, demonstrating an ultraviolet absorption maximum of low intensity at 275 to 280 mu., demonstrating a substantial absence of reduction or oxidation with 2,6-dichlorophenol indophenol reagent, substantially insoluble in a saturated aqueous ammonium sulfate solution, substantially unstable on boiling for at least three hours, substantially free of ribose, desoxyribose, sialic acid and phosphorus as determined by standard analytical techniques, and substantially stable on air oxidation under acid or neutral conditions.

Although the oncostatic principle may be obtained from any organism of the genus Calvatia, better results are achieved with organisms of the species Calvatia maxima (gigantea).

In the preparation of this oncostatic principle, preparations with highest activity have been obtained from aqueous extract of the fresh fruiting body of the organism. However, principles with similar oncostatic properties may also be obtained from the fermentation beer produced by propagation of the mycelium of the organism in submerged culture.

Further purification of the oncostatic principle may be obtained by subjecting the aqueous extract of the organism or the fermentation beer to fractionation with a water-miscible solvent such as acetone.

In a preferred practice of this further purification of the oncostatic principle, an aqueous solution of the oncostatic principle may be subjected to fractionation by the addition of acetone to obtain in the resulting aqueous mixture an acetone concentration of about 30% by volume, separating the resulting precipitate from the supernatant liquid, and increasing the acetone concentration in such supernatant liquid to about 75% by volume to precipitate the oncostatic principle. The resulting precipitate may be subjected to evaporation to remove the acetone.

The following is exemplary of the preparation of this oncostatic principle from the fresh fruiting body of the organism and by fermentation, and of the evaluation of the oncostatic principle in animals:

EXPERIMENTAL

A preparation was made by blending one part of fresh tissue of a fruiting body of a freshly collected specimen of *Calvatia maxima* with two parts of cold water. This extract was found active in the sarcoma 180 test; in a dilution of 1:100 the preparation (No. 9429) reduced the tumor size from 0.87 cm. diameter of the control to 0.49 cm. diameter when injected intraperitoneally in the usual test procedure. The designation of activity was ±— according to the Sloan-Kettering code which is described below. This water extract was precipitated with one volume of ethanol and the precipitate, after separation by centrifugation, was dissolved in water and made to the original volume. Tested in a dilution of 1:20 this preparation (No. 9430) held the tumor size to 0.22 cm. as compared to 1.45 cm. of the control; the inhibitory activity was designated as +. An aliquant of the water extract was held 42 days and was then heated to 100° C.; during heating the original volume of 80 ml. decreased to 68 ml., but the difference was made up by adding water. Injection of this preparation (No. 9509) resulted in a tumor size of 0.51 cm. compared with 0.89 of the control (±—). These results are summarized in Table 1.

Since this fractionation indicated that more than one tumor inhibitor might be present in the plant material, the following preparations were made. Material of the sporophore was extracted with water as described before and enough ethanol was added to make it 30 percent of the total volume. The precipitate was centrifuged off and dissolved in water (preparation No. 9896). The supernatant liquid was subjected to further ethanol precipitation bringing the ethanol to 70 percent of the total volume. The precipitate, dissolved in water, gave preparation No. 9897. The supernatant ethanol was evaporated and the volume adjusted to one-half of the original water extract (preparation No. 9898), as had been done in the case of preparations No. 9896 and 9897. A test of a preparation which was made by extracting the sporophore with absolute ethanol, evaporating the alcohol and adjusting to the original volume with water (preparation No. 9894) was also made. The activity of a water extract of the residue from the ethanol extraction is indicated in the test of preparation No. 9895. There was more anti-tumor activity present in the water extract than in the prior absolute ethanol Table 1.—*The Effect of Parenteral Injection of Extracts of* Calvatia maxima *on the Growth of Mouse Sarcoma 180*[1]

| Number of Preparation | Test Number S. K. I. | Mouse Toxicity | Dose: cc. twice daily | Effect[2] | Tumor diam. in cm./diam. of control tumor | Wt. Change in g./wt. change control | Deaths |
|---|---|---|---|---|---|---|---|
| 9429 | C 2437 | 0.5 (dil. 1:10) | 0.6 (dil. 1:100) | ±— | 0.49/0.87 | −2.0/+1.0 | |
| 9430 | C 2438 | 0.5 (dil. 1:10) | 0.5 (dil. 1:20) | + | 0.22/1.45 | −3.0/−0.5 | 2 |
| 9509 | C 2517 | 0.5 | 0.6–0.3 (dil. 1:10) | ±— | 0.51/0.89 | −1.0/−0.5 | 2 |

[1] Activity evaluation tests conducted at the Division for Experimental Chemotherapy, Sloan-Kettering Institute for Cancer Research, New York, New York.
[2] +, tumor diameter 25 percent or less of control; ±+, tumor diameter 25–50 percent of control; ±—, tumor diameter 50–75 percent of control.

Further tests were made with fresh mushrooms collected at that time. They represent the identical species but are extract. The results of these tests are summarized in Table 2.

Table 2.—*Anti-Tumor Activities of* Calvatia maxima *as Revealed by Futher Fractionation of Sporophore Extracts and Tested Against Sarcoma 180*[1]

| Number of Preparation | Test Number S.K.I. | Mouse Toxicity | Dose: cc. Twice daily | Effect[2] | Tumor diam. in cm./diam. of control tumor | Wt. change in g./wt. change control |
|---|---|---|---|---|---|---|
| 9894 | C 2904 | 0.5 | 0.5 (dil. 1:10) | ±+ | 0.50/1.15 | −4.0/−1.5 |
| 9895 | C 2905 | 1.0 | 0.5 (dil. 1:50) | ±+ | 0.22/0.57 | −2.0/ 0.5 |
| 9896 | C 2906 | 3.0 | 0.5 (dil. 1:10) | + | 0.17/0.72 | −3.0/−1.5 |
| 9897 | C 2907 | 3.0 | 0.5 (dil. 1:5) | ±+ | 0.44/0.93 | −2.0/−1.5 |
| 9898 | | 3.0 | 0.5 (dil. 1:100) | ±+ | 0.43/0.95 | −0.5/−2.0 |

[1] Tests conducted at the Division for Experimental Chemotherapy, Sloan-Kettering Institute for Cancer Research, New York, New York.
[2] +, tumor diameter 25 percent or less of control; ±+, tumor diameter 25–50 percent of control; ±—, tumor diameter 50–75 percent of control.

believed to be of different strains. They were collected in widely separated locations. Not all strains when tested as cold water extracts of the fresh fruiting bodies showed activity against sarcoma 180 comparable to that recorded before. Extraction of fresh sporophore with boiling water for 10 minutes resulted in inactive preparations. It appeared that some strains produced more of the anti-tumor activity than the others.

In order to investigate the nature of the activity the following experiment was conducted using frozen material of the sporophore of *Calvatia maxima*. One part of fungus was blended with two parts of cold water. An aliquant of this extract was precipitated with one and one-half parts of ethanol; the precipitate was dissolved in water and brought to the original volume. The ethanol of the supernatant liquid was evaporated and the resulting solution made to the same volume. Both the aqueous solution made up from the precipitate and that made from the material in the filtrate showed definite anti-tumor activity.

Additional tests were made to determine whether or not the active principle, or part of it, was dialyzable. Preparation No. 9906 was an aqueous solution of the precipitate resulting from an acetone precipitation in which only the material was considered that was brought down by increasing the acetone concentration from 30% to 70% of the final volume. This soluble precipitate did not contain a dialyzable principle. Preparation 9907 was the supernatant liquid of the above preparation, from which the acetone was driven off. It contained a dialyzable principle with tumor-inhibiting properties. Dialysis was performed at room temperature against distilled water which was replaced at intervals. The volume of water was the same as that of the liquid inside the membrane.

To characterize further the biological properties of the tumor inhibiting substances contained in *Calvatia maxima*, dilution tests on several of the previously mentioned preparations were performed at the Sloan-Kettering Institute. Inhibitory activity generally declined with increased dilution. Some representative data are assembled in Table 3.

Table 3.—*Tumor Inhibition of Dilutions of* Calvatia maxima *Extracts (Test Tumor: Sarcoma 180)*[1]

| Number of Preparation | Dose: cc. twice daily | Effect [2] | Tumor diam. in cm./diam. of control tumor | Wt. change in g./wt. change control | Deaths |
|---|---|---|---|---|---|
| 9895 | 0.5 (dil.1:50) | ±+ | 0.66/1.22 | −3.0/−2.0 | |
|  | 0.5 (dil.1:100) | ±− | 0.66/1.23 | −1.5/−2.0 | |
|  | 0.5 (dil.1:200) | ±− | 0.76/1.22 | −2.0/−2.0 | |
|  | 0.5 (dil.1:400) | ±− | 0.85/1.22 | −1.5/−2.0 | |
|  | 0.5 (dil.1:800) | − | 1.21/1.22 | −0.5/−2.0 | |
| 9898 | 0.5 (dil.1:100) | ±+ | 0.43/0.95 | −3.5/−2.5 | 1 |
|  | 0.5 (dil.1:200) | ±− | 0.67/0.95 | −1.0/−2.5 | |
|  | 0.5 (dil.1:400) | ±− | 0.56/0.95 | −1.0/−2.5 | |
|  | 0.5 (dil.1:800) | − | 0.77/0.95 | −1.0/−2.5 | |
| 9906 | 0.5 (dil.1:10) | ±+ | 0.43/1.02 | −4.5/−1.0 | 1 |
|  | 0.5 (dil.1:20) | ±− | 0.58/1.02 | −2.5/−1.0 | 1 |
|  | 0.5 (dil.1:40) | ±− | 0.55/1.02 | −1.0/−1.0 | |
|  | 0.5 (dil.1:80) | ±− | 0.77/1.02 | +0.5/−1.0 | |
| 9907 | 0.5 (dil.1:5) | ±+ | 0.47/1.02 | −2.5/−1.0 | |
|  | 0.5 (dil.1:10) | ±+ | 0.50/1.02 | −2.0/−1.0 | |
|  | 0.5 (dil.1:20) | ±− | 0.64/1.02 | −1.0/−1.0 | |
|  | 0.5 (dil.1:40) | ±− | 0.73/1.02 | −1.5/−1.0 | |

[1] Tests conducted at the Division for Experimental Chemotherapy, Sloan-Kettering Institute for Cancer Research, New York, New York.
[2] +, tumor diameter 25 percent or less of control; ±+, tumor diameter 25–50 percent of control; ±−, tumor diameter 50–75 percent of control.

In the production of the active principle having anti-tumor activity from the mycelium of *Calvatia maxima* in a submerged fermentation process, 35 Florence flasks, 500 ml., containing 125 ml. of a nutrient broth were inoculated with a suspension of *Calvatia maxima*. The flasks containing the inoculated nutrient broth were placed on a shaker in a room having the temperature maintained at 19° C. The flasks were stoppered with sterile cotton plugs and the shaker started. Aeration of the nutrient media occurred by the exchange of air from within the flask and the atmosphere outside of the flasks. Starting on the fourth day three flasks were removed from the shaker at four day intervals until the 36th day. The mycelium which had proliferated in the flask was blended with the culture beer and samples were evaluated for anti-tumor activity in mouse sarcoma 180. The results of the evaluation of the tests of activity against mouse sarcoma 180 were averaged and are tabulated in Table 4. The eight excess flasks were inoculated to be used as alternates should any flask become contaminated.

Table 4.—*The Effect of Parenteral Injection of Extracts of the Mycelium of* Calvatia maxima *on the Growth of Mouse Sarcoma 180* [1]

| Sample | Days Old | Effect [2] | Tumor Size/Control [2] | Percent Change | Percent Average |
|---|---|---|---|---|---|
| 1 | 4 | − | 1.00/0.89 | +12.3 | |
| 2 | 4 | − | 0.89/0.87 | +2.2 | +7.1 |
| 3 | 4 | − | 0.93/0.87 | +6.8 | |
| 4 | 8 | − | 1.04/1.28 | −18.8 | |
| 5 | 8 | − | 1.20/1.28 | −6.3 | −18.0 |
| 6 | 8 | ±− | 0.91/1.28 | −29.0 | |
| 7 | 12 | ±− | 0.73/1.15 | −36.6 | |
| 8 | 12 | − | 1.04/1.15 | −9.6 | −19.2 |
| 9 | 12 | − | 1.02/1.15 | −11.3 | |
| 10 | 16 | ±− | 0.68/0.91 | −25.3 | |
| 11 | 16 | ±− | 0.68/0.91 | −25.3 | −25.7 |
| 12 | 16 | ±− | 0.67/0.91 | −26.4 | |
| 13 | 20 | ±− | 0.71/1.16 | −38.8 | |
| 14 | 20 | ±− | 0.75/1.10 | −31.9 | −29.3 |
| 15 | 20 | − | 0.91/1.10 | −17.3 | |
| 16 | 24 | ±− | 0.75/1.35 | −44.5 | |
| 17 | 24 | ±− | 0.90/1.35 | −32.4 | −39.5 |
| 18 | 24 | ±− | 0.79/1.35 | −41.5 | |
| 19 | 28 | ±− | 0.76/1.05 | −27.7 | |
| 20 | 28 | ±− | 0.55/1.05 | −47.7 | −36.6 |
| 21 | 28 | ±− | 0.69/1.05 | −34.3 | |
| 22 | 32 | − | 1.06/1.38 | −23.2 | |
| 23 | 32 | ±− | 1.01/1.38 | −26.9 | −27.6 |
| 24 | 32 | ±− | 1.93/1.38 | −32.7 | |
| 25 | 36 | − | 0.94/0.94 | 0 | |
| 26 | 36 | − | 0.76/0.94 | −19.2 | −9.6 |
| 27 | 36 | − | 0.85/0.94 | −9.6 | |

[1] Tests conducted at the Division for Experimental Chemotherapy, Sloan-Kettering Institute for Cancer Research, New York, N.Y.
[2] +, tumor diameter 25 percent or less of control; ±+, tumor diameter 25–50 percent of control; ±−, tumor diameter 50–75 percent of control.

While in the foregoing specification specific embodiments of the invention have been set out in detail for purposes of illustration, it will be apparent to those skilled in the art that many variations may be made without departing from the scope of the invention.

This application is a continuation-in-part of our application Serial No. 607,285, filed August 31, 1956, now abandoned.

We claim:

1. The method of inhibiting neoplastic growth in living animals comprising: administering to an animal inflicted with a neoplasm at least one oncostatic principle of at least one organism of the genus Calvatia said principle comprising an aqueous extract prepared by contacting at least one organism of the genus Calvatia with water and separating the insoluble residue therefrom.

2. The method of inhibiting neoplastic growth in living animals comprising: administering to an animal inflicted with a neoplasm at least one oncostatic principle of at least one organism of the species *Calvatia maxima (gigantea)* said principle comprising an aqueous extract prepared by contacting at least one organism of the species *Calvatia maxima (gigantea)* with water and separating the insoluble residue therefrom.

3. An oncostatic principle comprising an aqueous extract prepared by contacting at least one organism of the genus Calvatia with water and separating the insoluble residue therefrom, said principle being characterized by being substantially soluble in water, by being substantially non-dialyzable, by being substantially insoluble in absolute benzene, ether, ethanol, methanol and acetonitrile, by being substantially insoluble in an aqueous 75% acetone solution, by being substantially stable in absolute ethanol, methanol, acetone, acetonitrile, ether and benzene, by being substantially stable during storage at −40° F. for six weeks, by being substantially stable to lyophilization, by being substantially filterable through a filter having the porosity of a Seitz filter, by demonstrating a substantial absence of absorption in the ultraviolet region except in the range of 275 to 280 mu., by containing a substantial absence of phosphorus, by demonstrating a substantial absence of reduction and oxidation on treatment with a 2,6-dichlorophenol indophenol reagent, by being substantially insoluble in a saturated aqueous ammonium sulfate solution, by being substantially unstable on boiling for at least three hours, by containing a substantial absence of ribose, desoxyribose and sialic acid as determined by standard analytical procedures, and by being substantially stable to air oxidation under acid and neutral conditions.

4. In a process for obtaining at least one oncostatic principle from an organism of the species *Calvatia maxima (gigantea)*, the steps of contacting at least one organism of the species *Calvatia maxima (gigantea)* with water to obtain an aqueous extract thereof, and separating the resulting aqueous extract from the insoluble residue.

5. In a process for obtaining the oncostatic principle of an organism of the species Calvatia maxima (gigantea), the steps of contacting at least a portion of at least one organism of the species Calvatia maxima (gigantea) with water to obtain an aqueous extract thereof containing the oncostatic principle, separating the resulting aqueous extract from the insoluble residue, adding alcohol to the separated aqueous extract to obtain in the resulting alcohol solution an alcohol concentration of about 30% by volume, separating the resulting precipitate from the supernatant liquid, adding alcohol to the separated supernatant liquid to obtain in the resulting alcohol mixture an alcohol concentration of about 75% by volume, separating the resulting precipitate containing the oncostatic principle from the supernatant liquid.

References Cited in the file of this patent
UNITED STATES PATENTS 2,564,889   Folkers _____ Aug. 21, 1951

OTHER REFERENCES

Pereira's Materia Medica and Therapeutics, 3rd ed., 1854, Blanchard and Lea, Philadelphia, p. 89.

The National Dispensatory, 5th ed., 1896, Lea Bros. and Co., Philadelphia, pp. 1000–1001.

The New Standard Formulary, 5th ed., 1920, G.P. Engelhard and Co., Chicago, p. 497.

Wilkins et al.: Ann. Appl. Biol. 31: 261–270, 1944.

Brotzu: Bull. Hygiene, October 1949, pp. 804 and 805.

Peterman et al.: Archives Biochem. and Biophysic, vol. 37, No. 1, pp. 117–130, 1952.

Bacteriologicals Reviews, vol. 19, No. 2, June 1955, pp. 65–74.